United States Patent [19]

Tagnon

[11] 3,711,191
[45] Jan. 16, 1973

[54] ABERRATION CORRECTED OPHTHALMIC PROGRESSIVE POWER LENSES

[76] Inventor: Luc Andre Tagnon, 6 rue Pastourella, Paris, France

[22] Filed: Sept. 16, 1971

[21] Appl. No.: 181,179

Related U.S. Application Data

[63] Continuation-in-part of Ser. No. 771,143, Oct. 28, 1968, abandoned.

[52] U.S. Cl..................................351/169, 351/176
[51] Int. Cl. ................................................G02c 7/06
[58] Field of Search..............................351/169, 176

[56] References Cited

UNITED STATES PATENTS

| | | | |
|---|---|---|---|
| 2,878,721 | 3/1959 | Kanolt | 351/169 |
| 3,041,789 | 7/1962 | Cretin-Maitenaz | 351/177 X |
| 3,169,247 | 2/1965 | Davis et al. | 351/167 |

FOREIGN PATENTS OR APPLICATIONS

| | | | |
|---|---|---|---|
| 775,007 | 5/1957 | Great Britain | 351/169 |

Primary Examiner—David H. Rubin
Attorney—Robert E. Burns et al.

[57] ABSTRACT

A novel type of ophthalmic progressive lens of which the one of its two refractive surfaces is a spherical or toric surface and the other of its two refractive surfaces determines with the first mentioned refractive surface a far vision lens portion with a first focal power corrected for the aberrations which are specific to far vision, a near vision lens portion with a second higher focal power corrected for the aberrations which are specific to near vision, and between said far and near vision lens portions, an intermediate vision lens portion with a focal power which progressively varies from said first focal power to said second higher focal power, said intermediate vision lens portion being corrected for aberrations specific to vision of an object point progressively drawing nearer to the lens.

4 Claims, 17 Drawing Figures

Fig.8

| FIG.8a | FIG.8b |
|--------|--------|
| FIG.8c | FIG.8d |

Fig.8d.

| | 76 | 78 | 80 | 82 | 84 | 86 | 88 | 90 | 92 | 94 | 96 |
|---|---|---|---|---|---|---|---|---|---|---|---|
| | | | | | | | | | | | |
| | 1504.1 | 1091.7 | 396.7 | | | | | | | | |
| | 1305.9 | 913.7 | 255.2 | | | | | | | | |
| | 1121.3 | 747.9 | 123.3 | | | | | | | | |
| | 950.2 | 594.3 | 01.1 | − 691.1 | −1289.3 | −1707.0 | | | | | |
| | 792.5 | 452.7 | − 111.4 | − 760.4 | −1323.1 | −1715.2 | −1947.7 | | | | |
| | 648.4 | 323.3 | − 211.3 | − 818.9 | −1352.5 | −1720.8 | −1944.5 | −2137.2 | | | |
| | 517.7 | 205.9 | −301.5 | − 871.4 | −1374.0 | −1720.7 | −1936.4 | −2126.4 | −2280.3 | | |
| | 402.1 | 100.7 | − 374.5 | − 910.2 | −1381.9 | −1708.7 | −1917.2 | −2104.8 | −2249.4 | | |
| | 298.4 | 09.1 | − 437.8 | − 938.3 | −1379.0 | −1686.3 | −1888.5 | −2074.0 | −2249.4 | | |
| | 209.9 | − 67.0 | − 486.7 | − 955.6 | −1360.6 | −1650.5 | −1847.2 | −2030.9 | −2206.3 | | |

Fig.8a.

|    | 50 | 52 | 54 | 56 | 58 | 60 | 62 | 64 | 66 | 68 | 70 | 72 |
|----|----|----|----|----|----|----|----|----|----|----|----|----|
| 6  | 1635.2 | 1639.2 | 1653.9 | 1677.0 | 1710.9 | 1753.7 | 1806.4 |        |        |        |        |        |
| 10 | 1244.6 | 1248.3 | 1262.0 | 1284.7 | 1317.4 | 1358.6 | 1409.5 | 1469.3 | 1540.4 | 1620.4 | 1710.9 | 1811.9 |
| 14 | 909.0  | 912.8  | 925.5  | 946.9  | 977.2  | 1016.4 | 1064.5 | 1122.7 | 1189.7 | 1266.5 | 1353.8 | 1451.5 |
| 18 | 628.6  | 632.0  | 644.1  | 663.7  | 692.0  | 728.6  | 774.0  | 828.2  | 891.2  | 964.5  | 1047.1 | 1140.8 |
| 22 | 403.3  | 406.0  | 417.3  | 435.1  | 460.5  | 493.6  | 535.3  | 585.1  | 643.7  | 712.2  | 790.2  | 878.4  |
| 26 | 233.1  | 235.9  | 244.8  | 259.7  | 281.7  | 311.3  | 348.2  | 392.6  | 446.0  | 509.0  | 581.5  | 663.7  |
| 30 | 118.0  | 120.1  | 127.0  | 138.9  | 155.9  | 179.3  | 209.8  | 247.8  | 294.9  | 351.4  | 417.3  | 493.6  |
| 34 | 50.7   | 52.1   | 56.9   | 65.0   | 77.3   | 94.5   | 118.0  | 148.4  | 187.4  | 235.9  | 294.9  | 365.2  |
| 38 | 16.8   | 17.7   | 20.6   | 25.8   | 34.1   | 46.0   | 63.6   | 86.4   | 118.0  | 158.3  | 209.8  | 272.2  |
| 42 | 03.5   | 04.0   | 05.6   | 08.3   | 13.5   | 21.6   | 34.1   | 52.1   | 77.3   | 111.3  | 155.9  | 212.5  |
| 46 | 00.2   | 00.4   | 01.0   | 02.4   | 05.6   | 11.3   | 20.6   | 35.3   | 56.9   | 86.6   | 127.0  | 179.3  |
| 50 | 00.0   | 00.0   | 00.2   | 01.2   | 03.5   | 08.4   | 16.8   | 30.5   | 50.7   | 79.3   | 118.0  | 168.7  |

Fig.8b.

| 96 | 94 | 92 | 90 | 88 | 86 | 84 | 82 | 80 | 78 | 76 | 74 |
|---|---|---|---|---|---|---|---|---|---|---|---|
|  |  |  |  |  |  |  |  | 1948.4 | 1806.2 | 1677.0 | 1559.0 |
|  |  |  |  |  |  | 1929.1 | 1767.9 | 1620.4 | 1484.2 | 1358.6 | 1244.7 |
|  |  |  |  | 1987.6 | 1806.2 | 1639.4 | 1484.2 | 1339.6 | 1207.7 | 1086.7 | 977.2 |
|  |  |  | 1923.4 | 1734.3 | 1559.0 | 1395.0 | 1244.7 | 1104.5 | 977.2 | 862.1 | 757.5 |
|  |  | 1908.4 | 1710.9 | 1526.3 | 1353.8 | 1194.2 | 1047.1 | 912.8 | 790.2 | 680.3 | 581.5 |
|  | 1942.8 | 1734.3 | 1540.4 | 1358.6 | 1189.7 | 1033.8 | 891.2 | 761.9 | 643.7 | 538.9 | 446.0 |
|  | 1806.4 | 1601.8 | 1409.5 | 1230.1 | 1064.5 | 912.8 | 774.0 | 648.4 | 535.3 | 435.1 | 348.2 |
|  | 1710.9 | 1507.3 | 1317.4 | 1140.8 | 977.2 | 828.2 | 692.0 | 569.6 | 460.5 | 365.2 | 281.7 |
|  | 1653.9 | 1451.3 | 1262.0 | 1086.7 | 925.5 | 778.1 | 644.1 | 523.9 | 417.3 | 324.6 | 244.8 |
|  | 1635.2 | 1433.0 | 1244.6 | 1070.0 | 909.0 | 762.0 | 628.6 | 509.1 | 403.7 | 311.4 | 233.1 |

Fig. 8c.

| | 50 | 52 | 54 | 56 | 58 | 60 | 62 | 64 | 66 | 68 | 70 | 72 | 74 |
|---|---|---|---|---|---|---|---|---|---|---|---|---|---|
| 54 | −01.2 | −01.2 | −02.5 | −04.6 | −08.6 | −16.1 | −21.6 | −26.8 | −17.8 | −00.9 | 32.6 | 76.2 | 156.2 |
| 58 | −22.0 | −31.3 | −49.6 | −76.5 | −114.5 | −148.7 | −176.7 | −200.2 | −211.7 | −212.7 | −204.9 | −175.7 | −128.4 |
| 62 | −99.0 | −111.4 | −143.6 | −187.6 | −250.7 | −310.4 | −375.4 | −430.6 | −478.1 | −510.5 | −526.5 | −532.6 | −516.8 |
| 66 | −237.3 | −249.6 | −283.4 | −338.5 | −411.5 | −495.6 | −589.0 | −680.0 | −769.8 | −849.6 | −905.1 | −938.2 | −951.4 |
| 70 | −412.1 | −422.9 | −456.8 | −515.0 | −596.2 | −696.9 | −812.1 | −933.9 | −1048.2 | −1152.9 | −1232.1 | −1291.9 | −1331.6 |
| 74 | −593.7 | −606.0 | −641.4 | −696.8 | −773.6 | −882.7 | −1006.9 | −1139.8 | −1269.2 | −1382.5 | −1476.5 | −1552.5 | −1606.0 |
| 78 | −771.6 | −784.0 | −817.9 | −876.4 | −959.5 | −1065.8 | −1188.9 | −1318.1 | −1447.1 | −1563.6 | −1661.5 | −1740.6 | −1797.9 |
| 82 | −946.0 | −956.8 | −990.7 | −1049.3 | −1129.4 | −1238.8 | −1362.1 | −1494.6 | −1622.5 | −1738.1 | −1836.3 | −1921.5 | −1980.0 |
| 86 | −1112.2 | −1124.5 | −1158.4 | −1218.5 | −1300.2 | −1406.5 | −1529.8 | −1662.3 | −1801.0 | −1913.5 | −2012.1 | −2096.9 | −2155.4 |
| 90 | −1277.8 | −1290.2 | −1322.5 | −1382.6 | −1462.7 | −1564.4 | −1675.4 | −1803.2 | −1923.5 | −2032.9 | −2131.5 | −2213.2 | −2271.5 |
| 94 | −1445.2 | −1446.0 | −1435.2 | −1540.0 | −1612.5 | −1697.2 | −1785.1 | −1882.1 | −1974.6 | −2059.3 | | | |

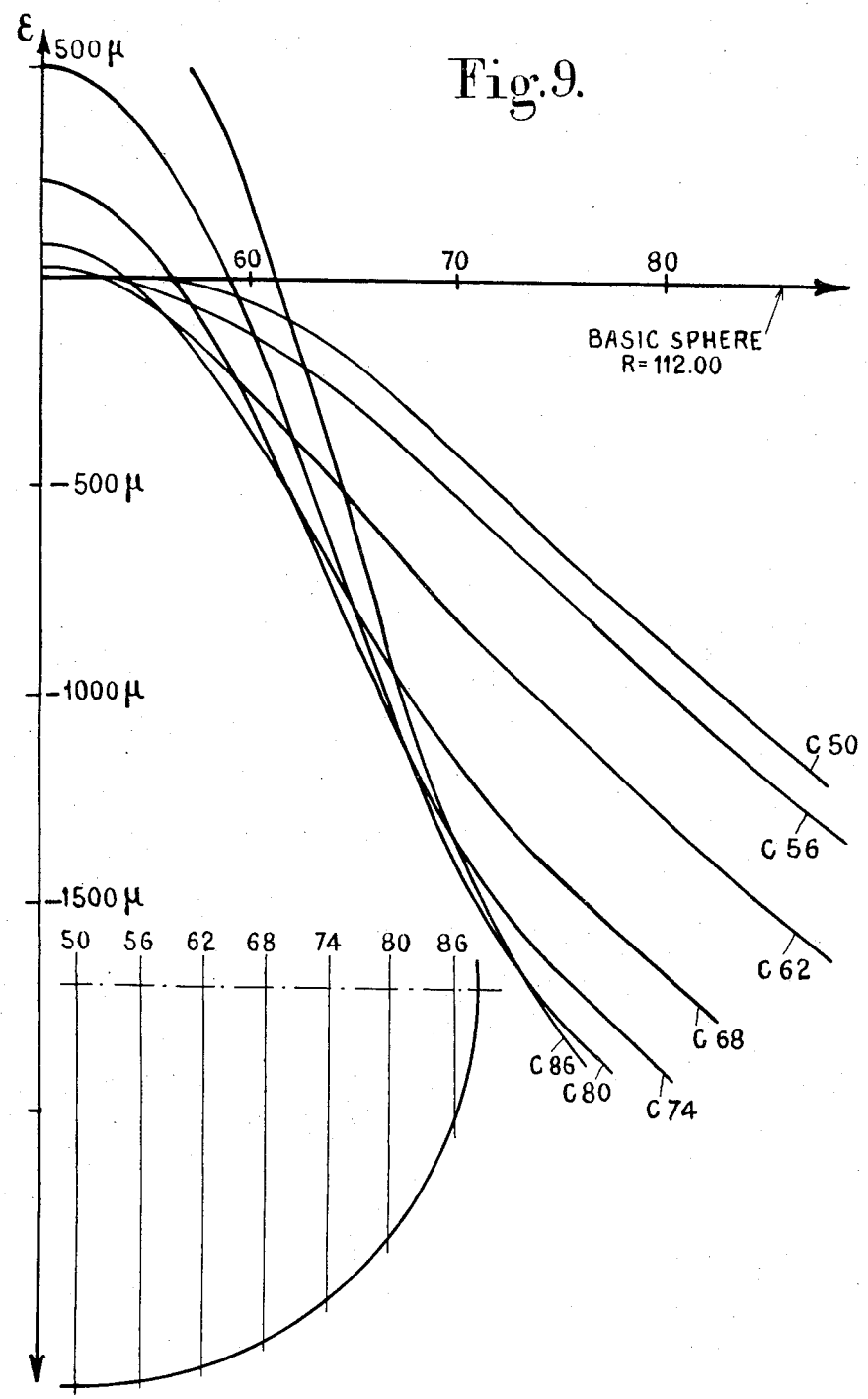

ABERRATION CORRECTED OPHTHALMIC PROGRESSIVE POWER LENSES

This application is a continuation-in-part application of the now-abandoned parent application serial number 771,143, filed Oct. 28, 1968, by the same applicant as that of the present invention.

BACKGROUND OF THE INVENTION

This invention relates in general to ophthalmic lenses having a progressively varying focal power, hereinafter referred to as ophthalmic progressive lenses or, merely, progressive lenses, and it has reference more particularly to improvements in ophthalmic progressive lenses having a high spherical or cylindrical power in far vision.

When the eye before which a ophthalmic lens is placed utilizes a peripheral zone thereof, aberrations such as astigmatism and notably field curvature appear and reduce the quality of the eye ametropia correction.

In practice, this defect is negligible in the case of negative power lenses and low positive power lenses provided that these lenses have a suitable curvature. On the other hand, it limits the useful field of vision of an eye provided with a high-power positive lens, for the higher the lens power the smaller the useful area of the lens.

It is known to resort to aspheric surfaces for reducing these aberrations. The term "aspheric" usually denotes surfaces of revolution such as paraboloids and ellipsoids, for example, obtained by causing a same parabolic or elliptic curve to rotate about the axis of the lens. These surfaces are currently used in instrumental optics. They permit a certain correction of the aberrations of ophthalmic lenses when these are designed for a single type of vision, for instance far vision. Finally, in many cases the human eye suffers from astigmatism, for example the post-operative residual corneal astigmatism of a patient operated for cataract, which entails the use of astigmatic lenses, for example toric lenses having a spherical power +12.00 and a cylindrical power +3.00. It will be readily understood that hitherto known aspheric surfaces of revolution are not capable of correcting such lenses in a very satisfactory manner. In the above mentioned now-abandoned parent application, novel aberration correcting surfaces have been proposed, which give the only complete solution to this problem. These surfaces permit the correction of aberrations of high power toric lenses, a problem hitherto unsolved.

To compensate the ametropia of an eye having preserved its accomodation capacity, or to compensate the ametropia in a single case of vision, for example vision at reading distance, of an eye having lost its full accomodation capacity these corrected lenses are quite satisfactory.

When it is desired to correct a strong hypermetropia of an eye having lost its full accomodation capacity, for example an eye operated for cataract, one can think of using a high-power multifocal or progressive lens.

It is well known to fit an eye which has lost its full accomodation power with a progressive lens. This type of lens has been in common use for more than ten years.

A progressive lens comprises two refractive surfaces on opposite sides of a block of refringent material. A first one of said two retractive surfaces is usually a spherical or toric surface; the second refractive surface is the so called progressive surface.

This progressive surface is designed and manufactured so as to present:

1 - An upper single focus spherical surface portion which determines with said first refractive surface of the lens a far vision zone or lens portion with a first focal power, and the optical center of which is the optical center of the whole progressive lens.

2 - A lower single focus spherical surface portion which determines with said first refractive surface of the lens a near or reading vision zone or lens portion with a second higher focal power, and which is located around a point called the near vision center.

3 - An intermediate progressive surface portion of which the meridian curve extending from the optical center of the lens to the near vision center is called the meridian of progression along which the spherical power of the lens varies from its valve (the first focal power), at the optical center of the lens to its value (the second higher focal power) at the near vision center according to a predetermined law. This has been obtained by giving, at every point of said meridian of progression, the same value to the two main radii of said intermediate progressive surface portion, said value being calculated for each point of said meridian curve of progression so as to give to the lens the desired spherical power at the considered point. So, the meridian of progression is a so-called umbilical curve for the progressive refracting surface, that is to say a curve along which at each point thereof the two main radii of the surface to which it belongs have identical values.

Elementary optical calculation adapted to the manufacturing processes permits to determine such progressives surfaces point by point and to produce them at an economical industrial scale as follows.

Every point $A_i$ of the desired surface is referenced on the one hand by the two spherical coordinates (hereinafter referred to as $V_x$ and $V_y$) of the point P of intersection with a basic sphere Q of the radius of said sphere Q passing by the considered point $A_i$ of the desired surface, and on the other hand by the distance $\epsilon_i$ between said considered point $A_i$ of the desired surface and said point P (see FIG. 7 of the enclosed drawings). Thus, the surface is determined by a table of dicrepencies or distance $\epsilon_i$ of said surface, the distribution of which is choosen to be uniform to allow an easy interpolation; for instance, $V_x$ and $V_y$ will be the spherical coordinates of the points of intersection of regularly spaced meridian curves with regularly spaced parallel curves of the basic sphere Q. Then, a high stress resistant steel patron of the aberration correcting surface is ground, point by point, by means of the diamond wheel grinding machine disclosed in the U.S. Pat. No. 2,982,058, for the use of which the discrepency table must be transformed into a grinding table by means of simple calculation taking into account the geometrical features of the machinery, such as for instance the diameter of the grinding wheel. Then, this patron is reproduced by means of the reproducing machine disclosed in the U.S. Pat. No. 3,041,789, on a block of refringent material to make a lens blank, or on a suitable material to make a mould which permits to obtain a lens by casting a polymerizable material, or on a hard refractory material used as a stand upon which a glass block is caused to weight down when put in a temperature regulated furnace. The surface is then smoothed by means of the machine disclosed in the U.S. Pat. No. 3,021,647 which does not alter its shape, than polished by means of well known flexible polisher machinery. The commonly assigned U.S. Pat. application Ser. No. 19,772 filed Mar. 4, 1970, in the name of B. CRETIN-MAITENAZ, describes how these progressive surfaces have been improved by taking into account the convergence of the sight axes of a patient aiming at an object point drawing nearer to him. These progressive surfaces with an umbilical meridian curve of progression have met a great success in spite of the well known but unavoidable lateral aberrations. They permit to make up for lack of accomodation power of patients having a far vision ametropia below about 8.00 diopters.

But when this ametropia is above this value, as it is in the case, for instance, of an aphakic patient, the aberrations met in the case of high power single focus lenses, bring such a drastic change in the optical characteristics of the lens not only in the far vision zone but also in the intermediate and near vision zone, that the useful areas of these zones (i.e., the areas of these zones where the aberrations remain tolerable) decrease and even disappear as the power of the lens increases.

In order to correct the aberrations of such high power progressive lenses it has been suggested to associate to the progressive surface with the umbilical meridian curve, forming one of the two refractive surfaces of the lens, an aspheric aberration correcting surface of a known type intended for correcting the aberrations of a single focus lens having the same focal power as the far vision zone of the progressive lens, to constitute the second refractive surface of the lens. Such a high-power progressive lens is well corrected for aberrations in its far vision zone, but the aberrations in intermediate an near vision zones are slightly decreased, unchanged or even aggravated according to the characteristics of the needed progressive lens. This poor result together with the tremendous increase of the price of such lenses make this solution unsuitable.

High-power progressive lenses corrected for aberrations by using such aspheric aberration correcting surfaces are definitely unusable when the power needed for the far vision zone is above about 8.00 diopters.

This problem is so important, that in some cases, it has been solved by the combination of a low-power progressive lens with an umbilical meridian of progression, and a contact lens giving the additional spherical or torical power; this is indeed a very expensive solution.

SUMMARY OF THE INVENTION

It is the essential object of the present invention to provide a novel type of ophthalmic progressive lens of which the one of its two refractive surfaces is a simple surface and the other of its two refractive surfaces determines with the first mentioned refractive surface a far vision lens portion with a first focal power corrected for the aberrations which are specific to far vision, a near vision lens portion with a second higher focal power corrected for the aberrations which are specific to near vision, and between said far and near vision lens portions, an intermediate vision lens portion with a focal power which progressively varies from said first focal power to said second higher focal power, said intermediate vision lens portion being corrected for aberrations specific to vision of an object point progressively drawing nearer to the lens. In this specification and in the claims attached thereto, by "simple surface" is meant a spherical or toric surface.

More precisely the invention provides a concavo-convex ophthalmic lens with a progressively varying focal power for correcting high ametropia, comprising two refractive surfaces formed on opposite sides of a block of refringent material, the one of said two opposite refractive surfaces being a simple surface and the other of said two opposite refractive surfaces being a so-called progressive surface, said simple surface and said progressive surface determining therebetween, when the lens is in use, an upper single focus lens portion for far vision having a first focal power and the optical center of which coincides with the optical center of the whole lens, a lower single focus lens portion for near vision having a second higher focal power and which is located around a point called the near vision center, and an intermediate progressive power lens portion extending from the optical center of the lens to the near vision center and on either side of the meridian plane of the lens containing said near vision center, the focal power in said intermediate lens portion progressively increasing from said first focal power at said optical center to said second higher focal at said near vision center according to a predetermined law of progression along said meridian plane containing said near vision center and the meridian plane of progression, wherein said progressive surface is corrected for aberration and comprises:

an upper surface portion corresponding in position to said upper for vision lens portion, and which is identical to the corresponding upper surface portion of a first aspheric aberration correcting surface operative to correct aberrations for far vision of a first single focus lens having the same focal power as the upper far vision lens portion, said upper surface portion having at the optical center a tangential radius of curvature of a first value and a sagittal radius of curvature of a second value, a lower surface portion corresponding in position to said lower near vision lens portion, and which is identical to the corresponding lower surface portion of a second aspheric aberration correcting surface operative to correct aberrations for a vision distance of 0.33 m of a second single focus lens having the same focal power as the lower near vision lens portion, said lower surface portion having at said near vision center a tangential radius of curvature of a third value and a sagittal radius of curvature of a fourth value, said second aspheric aberration correcting surface being such that said second single focus lens exhibits neither astigmatism nor field curvature at a point having a location on said second aspheric aberration correcting surface corresponding to the location of the near vision center on said progressive surface, whereby the ophthalmic lens exhibits neither astigmatism nor field curvature at said near vision center, and an intermediate surface portion corresponding in position to said intermediate progressive power lens portion, of which the intersection with said meridian plane of progression is a curve so-called meridian curve of progression of which the radius of curvature (tangential radius) increases or decreases according as the progressive surface is the concave or convex refractive surface of the lens, respectively, from said first value of the tangential radius of the upper surface portion at the optical center to said third value of the tangential radius of the lower surface portion at the near vision center, so that the tangential focal power in the intermediate lens portion progressively increases according to the predetermined law of progression from the value of the tangential focal power at said optical center to the value of the tangential focal power at said near vision center, and of which the intersection with a plane perpendicular to said meridian curve of progression at a point thereof travelling from the optical center to the near vision center is a curve of which the radius of curvature (sagittal radius) at said travelling point increases or decreases according as the progressive surface is the concave or convex refractive surface of the lens, respectively, from said second value of the sagittal radius of the upper surface portion at the optical center to said fourth value of the sagittal radius of the lower surface portion at the near vision center, so that the sagittal focal power in the intermediate lens portion progressively increases according to the same predetermined law as the tangential focal power from the value of the sagittal focal power at the optical center to the value of the sagittal focal power at the near vision center, the increasing or decreasing rate of the value of the tangential radius being always smaller than the increasing or decreasing rate, respectively, of the value of the sagittal radius.

To design and make ophthalmic lenses of the invention, and more particularly to design and make their progressive surface corrected for aberrations, the techniques applied for designing and manufacturing the previously known progressive surfaces with an umbilical curve of progression, uncorrected for aberrations, are readily applicable here. These techniques consist in resorting to apparatus of the type described in the above-mentioned U.S. Pat. Nos. 2,988,058, 3,041,789 and 3,021,647

DESCRIPTION OF THE DRAWINGS

Other objects, features and advantages of the present invention will appear more clearly as the following description proceeds with reference to the accompanying drawings illustrating diagrammatically by way of example various forms of embodiment of the ophthalmic lenses according to the present invention. In the drawings:

FIGS. 8a, 8b, 8c and 8d assembled as shown in FIG. 8 represent the discrepency table of the right-hand half of the aberration correcting progressive surface of an examplary progressive lens according to the invention having a focal power of + 12.00 D in its upper far vision portion and an addition of power of ' 3.00 D in its intermediate vision portion, it being assumed that the meridian curve of progression of this examplary progressive lens lies in the vertical meridian plane which divides said lens, when in use, into a right-hand half and a left-hand half which are symmetrical with respect to this vertical meridian plane;

FIG. 9 shows the sections of the lower right-hand quarter of the aberration correcting progressive surface of the examplary progressive lens by seven planes parallel to the vertical meridian plane of progression of said examplary lens, said sections being plotted in terms of discrepencies with respect to a basic sphere;

DESCRIPTION OF THE PREFERRED EMBODIMENTS

Figure 1:
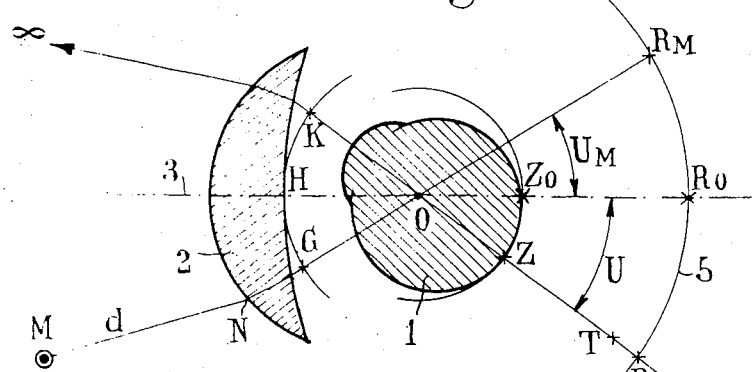
FIG. 1 illustrates in diagrammatic form an eye with which a correcting lens is associated, this eye looking successively at an object point located at infinity and an objet point located at a finite distance.

Referring first to FIG. 1, an eye 1 looks at a point located at infinity through its corrector lens 2 having an optical axis 3 passing through the center of rotation O of the eye, the axis of vision forming an angle U with the optical axis 3. Assuming that if $U = O$ the ametropia correction is perfect, a point at infinity gives an image ($R_o$) which, when received by the optical instrument constituted by the human eye, forms an image ($Z_o$) upon the retina. When, without altering its accomodation, the eye rotates about O, a point at infinity will be seen clearly, irrespective of the value of angle U, if the image R of this point describes a sphere 5 having a center O and a radius $ORo$.

In practice, if the lens has to be shaped to have a spherical surface, for example for any value of U other than O, the light ray from the object point lying at infinity will bear on a sagittal focus S and a tangential focus T, and the circle of least confusion lies at I. The field curvature IR and the astigmatism TS are the main aberrations disturbing the correction of the eye's ametropia.

Figure 2:
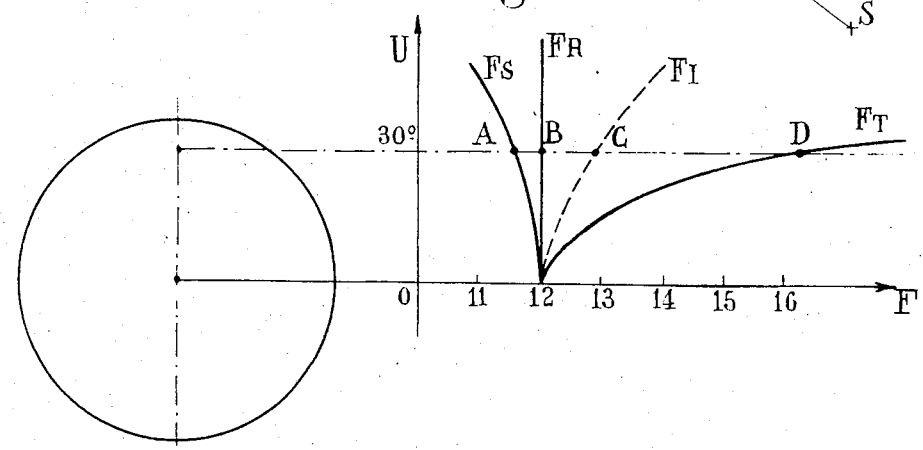
FIG. 2 is a diagram showing the aberrations under distant-vision conditions with a spherical lens having a + 12.00 diopter power, as a function of the angle of vision to the horizontal.
Figure 3:
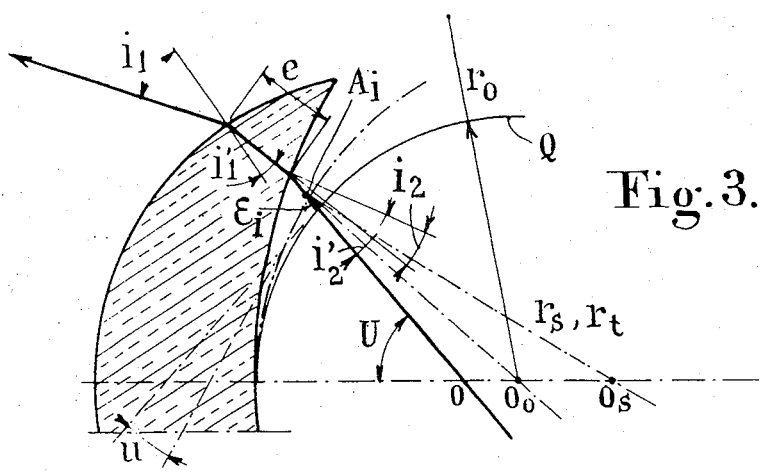
FIG. 3 shows, in a meridian plane of symmetry for sake of simplification, the elements which are used for the calculation of the discrepency $\epsilon_i$ of a point $A_i$ of the desired surface with respect to the basic sphere Q centered at $Oo$ and having a radius $r_o$, the sight axis making an angle U with the horizontal, $i1, i'1, i'2, i2$ being the refracting angles at the points of intersection of the sight axis with the refracting surfaces of the lens to be corrected for aberrations, $e$ being the length of the path of light ray in the glass, and Os the intersection of the optical axis and the perpendicular at Ai to the desired surface, bearing its two main radii $r_s$ and $r_t$.

FIG. 2 illustrates the aberrations of a spherical power lens of + 12.00 diopters as a function of the angle U for far vision. These curves illustrate not the variation in the position of the various images but the variation in the reciprocals of the distances in meters from said images to a same reference point.

To simplify the following calculations the point of reference is selected as customary at the intersection of the central ray of the direction of far vision with the circle centered at O and having a radius OH of which the value, for all practical purposes, is of the order of 27 to 28 millimeters (FIG. 1). This point is denoted K for far vision and G when the eye looks at an object point M. Consequently, these reciprocals are as follows:

$$F_T = 1/KI, F_S = 1/KS, F_1 = 1/KI \text{ and } F_R = 1/KR = 1/HRo$$

For far vision, the eye does not accomodate and $F_R$ is a constant power.

Figure 4:
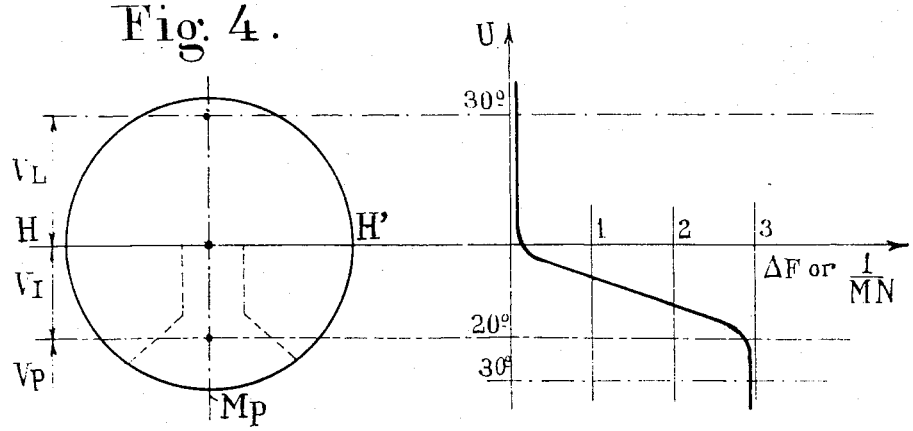
FIG. 4 is a diagram showing the characteristic curve of a progressive lens.
Figure 5:
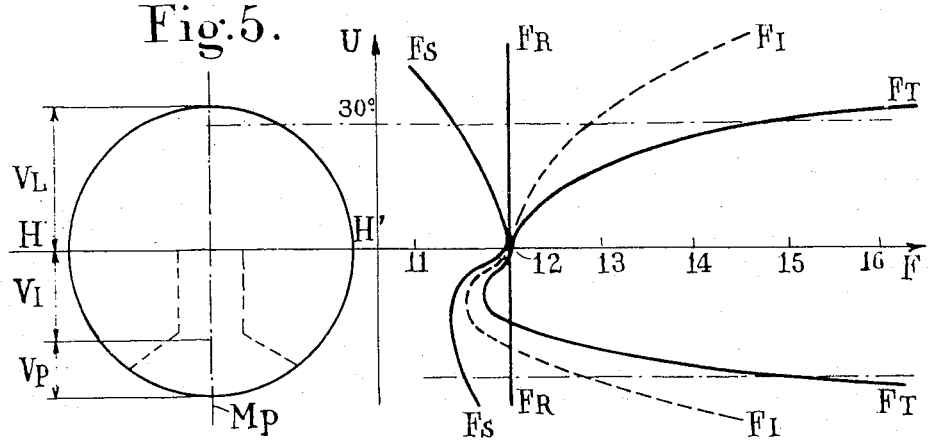
FIG. 5 is another diagram showing the aberrations of a progressive lens having a + 12.00 diopter power in far vision, when the wearer scans the meridian plane of progression.
Figure 6:
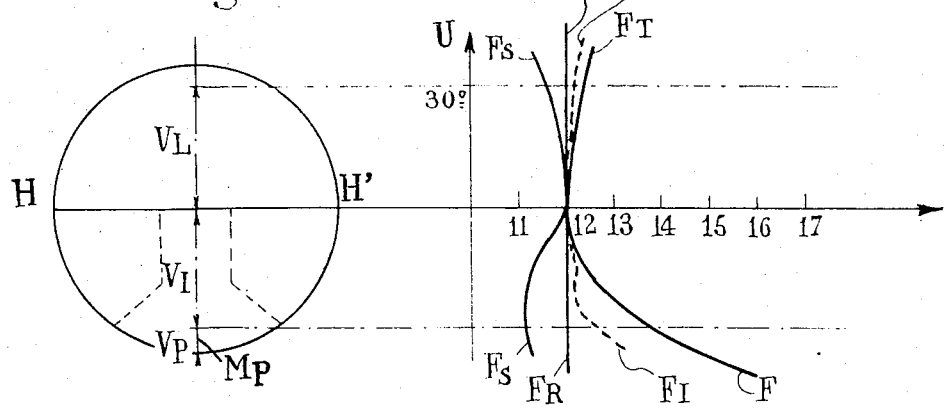
FIG. 6 is a diagram showing the aberrations of the same lens but corrected by an aspheric surface of revolution according to the prior art.

FIG. 2 shows that a + 12.00-diopter spherical lens, if $U = 30°$, has a field curvature $c = BC = F_1 - F_R = 0.65$ D, and an astigmatism $a = AD = F_T - F_S = 4.50$ D. This + 12.00 diopter spherical lens for $U = 30°$ is in fact a toric lens having a spherical power of + 11.50 diopters and a cylindrical power of + 4.50 diopters due to the aberrations. When the eye is directed for observing a nearby object (FIG. 1), for example a point M located at a distance $d$ of, say, 33 centimeters, and assuming that this eye cannot accomodate itself to this observation, the lens must have an additional power capable of keeping the image $R_M$ of M on the sphere 5. This additional power may be obtained notably by constructing a lens having a concave or convex progressive-power surface. When this accommodation capacity is zero, a surface giving 3.00 additional diopters and of which the law of progression of the focal power along its meridian of progression is given in FIG. 4 is generally sufficient. In other words the right-hand part of FIG. 4 shows how the focal power varies as a function of angle of vision U along the so-called meridian of progression Mp in a typical progressive power lens which, for the purpose of simplification of the explanation, has been choosen symetrical with respect to its meridian of progression Mp shown in a vertical position. FIG. 5 illustrates the aberrations of a lens of this character which, in far vision, has a spherical power of 12 diopters. FIG. 6 illustrates the aberrations of a same lens but corrected by an aspheric surface of revolution of the prior art. Of course, the improvement is very considerable in distant vision but remains practically null in both intermediate vision and reading vision. Moreover the two refractive surfaces of such a lens are somewhat complicated since one is a progressive surface, and the other an aspheric surface.

A progressive-power lens characterized by a still better correction of its aberrations will be obtained according to the invention by constructing this lens with a simple surface as one of its two refractive surfaces, for example a convex sphere, and an aberration correcting progressive surface as the other of its two refractive surfaces (by aberration correcting progressive surface is meant a refractive surface of the lens which imparts to said lens both the desired progressive addition of its focal power and the correction of its own aberrations) which is obtained as follows:

The upper portion of this aberrations progressive surface, which corresponds to the far vision zone of the lens is identical to the corresponding upper portion of a first aspheric aberration correcting surface of a known type operative to correct the aberrations of a first single focus lens having the same focal power as the far vision zone of the desired progressive lens.

The lower portion of said aberration correcting progressive surface corresponding to the near vision zone of the lens is identical to the corresponding lower portion of a second aspheric aberration correcting surface adapted to correct the aberrations of a second single focus lens having the same focal power as the near vision zone of the desired progressive lens.

This second aspheric aberration correcting surface is calculated for minimizing aberrations in case of vision at an object point spaced 0.33 m from the eye and is so determined that at a point thereof which is located in its vertical meridian plane and spaced 14 mm for instance from the optical center of said second single focus lens, the latter shows neither astigmatism nor field curvature. The area around this point of said second single focus lens which is effectively used, that is, which corresponds in position to the desired near vision zone of the progressive lens is well corrected for the aberrations, of course at the expense of the correction of aberrations of the other portions of said single focus lens, as it is well known in the art. This is of no importance as these badly corrected portions are not used in the aberration correcting progressive surface according to the present invention.

To these first and second aberration correcting surfaces correspond respective discrepency tables of which those portions which correspond to said upper far vision and lower near vision surface portions, respectively, are posted up into a single table in the portions thereof which correspond to the respective above-mentioned portions of the discrepency tables of the first and second aberration correcting surfaces. In the case of an aberration correcting progressive surface which is symmetrical with respect to its meridian plane Mp containing the meridian curve of progression, the upper portion of the aberration correcting surface of the first single focus lens, which is downwardly limited for instance by the horizontal meridian plane of the lens, is the upper half of the desired surface. The said effectively used portion of the second single focus lens is upwardly limited by the plane perpendicular to its vertical meridian plane containing the said point for which the lens shows neither field curvature nor astigmatism. (This point will be hereinafter referred to as the aberration-free point). The corresponding portion of the discrepency table of said second aberration correcting surface is posted up so as to superimpose this vertical meridian plane to the vertical meridian plane of said upper portion in a common vertical meridian plane Mp, the said aberration-free point being downwardly spaced 14 mm, in the above example, from the optical center of said upper portion. This aberration-free point is taken as the above mentioned near vision center.

The intermediate progressive portion of the desired surface is then obtained as follows.

This intermediate progressive portion extends from the optical center of the upper portion (the optical center of the whole lens) to the above chosen near vision center.

A law of progression of the tangential power in the above-mentioned meridian plane M$p$ is chosen. For instance the law represented in FIG. 4 which affords the best comfort for the user of the lens. By very simple optical calculation through the lens, this law of variation of the tangential power leads to the law of variation of the tangential radius of curvature $r_t = C1\ (V)$, in the meridian M$p$, that is to say to the profile of the meridian curve of progression, this tangential radius taking, at the optical center of said upper portion, the value of the radius of curvature (tangential radius) of the intersection curve resulting from the intersection of the vertical meridian plane M$p$ with said upper aspheric aberration correcting surface portion, and, at the near vision center, the value of the radius of curvature (tangential radius) of the intersection curve resulting from the intersection of said lower aspheric aberration correcting surface portion with said vertical meridian plane M$p$.

The meridian curve of progression is thus determined in the meridian plane M$p$.

On both sides of said meridian curve of progression the desired surface is determined as follows.

Its curve of intersection with a plane perpendicular to the meridian curve of progression at a random point thereof is given a radius, the sagittal radius, which determines, through the lens, a sagittal power of the same value as the tangential power in this random point. This, when done step by step for each point of the meridian curve, leads to a law of variation of the sagittal radius $r_s = C2\ (V)$, with $r_s$ taking, as previously explained for $r_t$, at the optical center of the lens the value of the radius of curvature (sagittal radius) of the curve resulting from the intersection of the upper aspheric aberration correcting surface portion with the horizontal meridian plane of the lens (when the above-mentioned simple surface is a spherical surface, the upper aspheric aberration correcting surface portion is a portion of a surface of revolution whereby the tangential radius of curvature $r_t$ and the sagittal radius of curvature $r_s$ of the aberration correcting progressive surface are identical at the optical center of the lens), and at the near vision center the value of the sagittal radius of the lower aspheric aberration correcting surface portion.

Thus it is easy to obtain the dicrepency table of the intermediate progressive portion of the desired aberration correcting progressive surface of the invention in the vicinity of the meridian curve of progression.

It is to be noted that due to aberrations, the two laws $r_t = C1\ (V)$ and $r_s = C2\ (V)$ are different. The meridian curve is no longer an umbilical curve of the progressive surface as it has been always the case in known progressive surfaces of the prior art.

The respective values $r_t$ and $r_s$ of the tangential and sagittal radius vary along the meridian curve of progression according to the relative positions of the simple surface and the aberration correcting progressive surface on the lens. More precisely, when the aberration correcting progressive surface is the concave refractive surface of the lens, $r_t$ as well as $r_s$ increase along the meridian curve of progression from their respective values at the optical center to their respective values at the near vision center, whereas, when the aberration correcting surface is the convex refractive surface of the lens, $r_t$ and $r_s$ decrease along the meridian curve of progression from their respective values at the optical center to their respective values at the near vision center, and in both cases the increasing or decreasing rate of $r_t$ is always smaller than the increasing or decreasing rate, respectively, of $r_s$.

To obtain a complete discrepency table, one must determine the parts of the surface on either sides of the above-determined intermediate progressive surface portion. These remaining parts, as it is well known in the previous art in connection with progressive surfaces are plagued with unavoidable aberrations and for this reason are unusable. They must be chosen so as to lead to a workable continuous surface and to be as smoothly shaped as possible to avoid too large deformations of peripheral field of view which are a great source of discomfort. To this end one proceeds as in the previous art. For instance, a family of evoluting curves, let us say ellipses for instance, are calculated so as to satisfy the following conditions:

1 - They are situated in respective planes which are perpendicular to the meridian curve of progression at successive points thereof.

2 - They admit as osculating circle at the intersection points of said respective planes with said meridian curve of progression, the circle having the above-determined radius $r_s$ at considered point of the meridian curve of progression.

3 - They take a shape close to that of the intersection curve of the upper aberration correcting surface portion with the horizontal meridian plane when the considered point of the meridian curve of progression draws nearer to the optical center, and close to that of the intersection curve of the lower aberration correcting surface portion with the plane perpendicular to said meridian curve of progression at the near vision center when the considered point of the meridian curve of progression draws nearer to said near vision center.

The discrepency table thus obtained, is then corrected to give the desired smoothed lateral complementary surfaces as it will be explained hereinunder.

EXAMPLE

Figure 11:
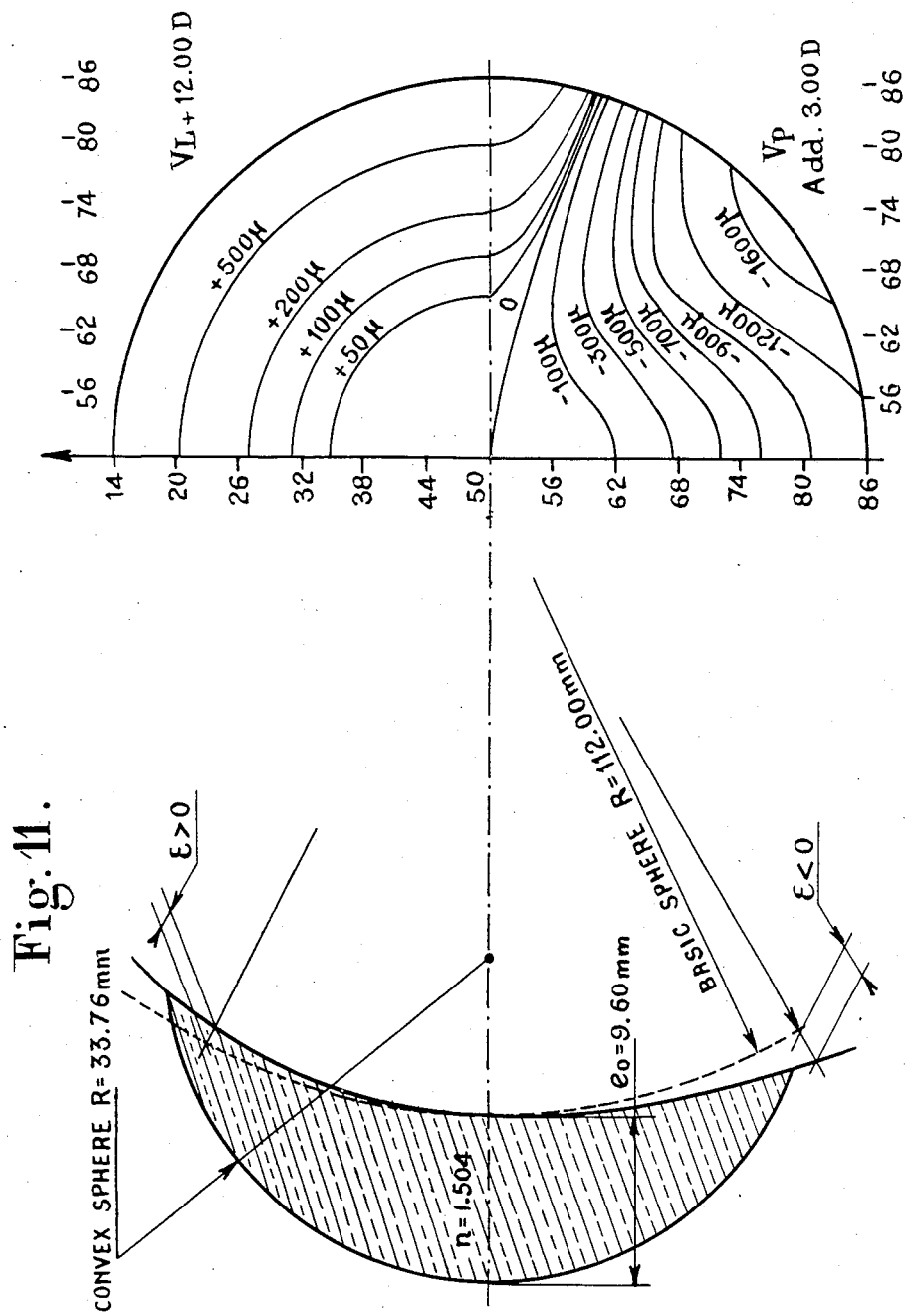
FIG. 11 shows the general characteristics of the examplary lens and iso-discrepency curves of the right-hand half of the aberration correcting progressive surface of the examplary lens.

To illustrate the above description of the invention let us consider a progressive lens having a spherical far vision power of + 12.00 diopters and a near vision power of 15.00 diopters, that is to say with an addition of + 3.00 diopters of which the characteristic is given on the left-hand side of FIG. 11. With a concave progressive surface according to the prior art, that is to say, a surface comprising spherical uncorrected far vision and near vision surface portions, and an intermediate progressive surface portion with an umbilical meridian curve of progression, the aberrations of such a lens when the eyes sight scans the meridian plane of progression are represented in FIG. 5. With the usual values of the acceptance capacity of the normal human eye, these curves shows that for an eye having lost its full accommodation power, the usable zone of the lens is reduced to a small area around the optical center.

The correction obtained by combining said concave progressive surface, with a known convex aspheric aberrations correcting surface such as one for a single focus lens having the same focal power as the far vision portion of the desired progressive lens, leads to the curves represented FIG. 6. Of course the improvement is great in far vision, but is almost non-existent in intermediate and near vision portions of the lens.

Figure 7:
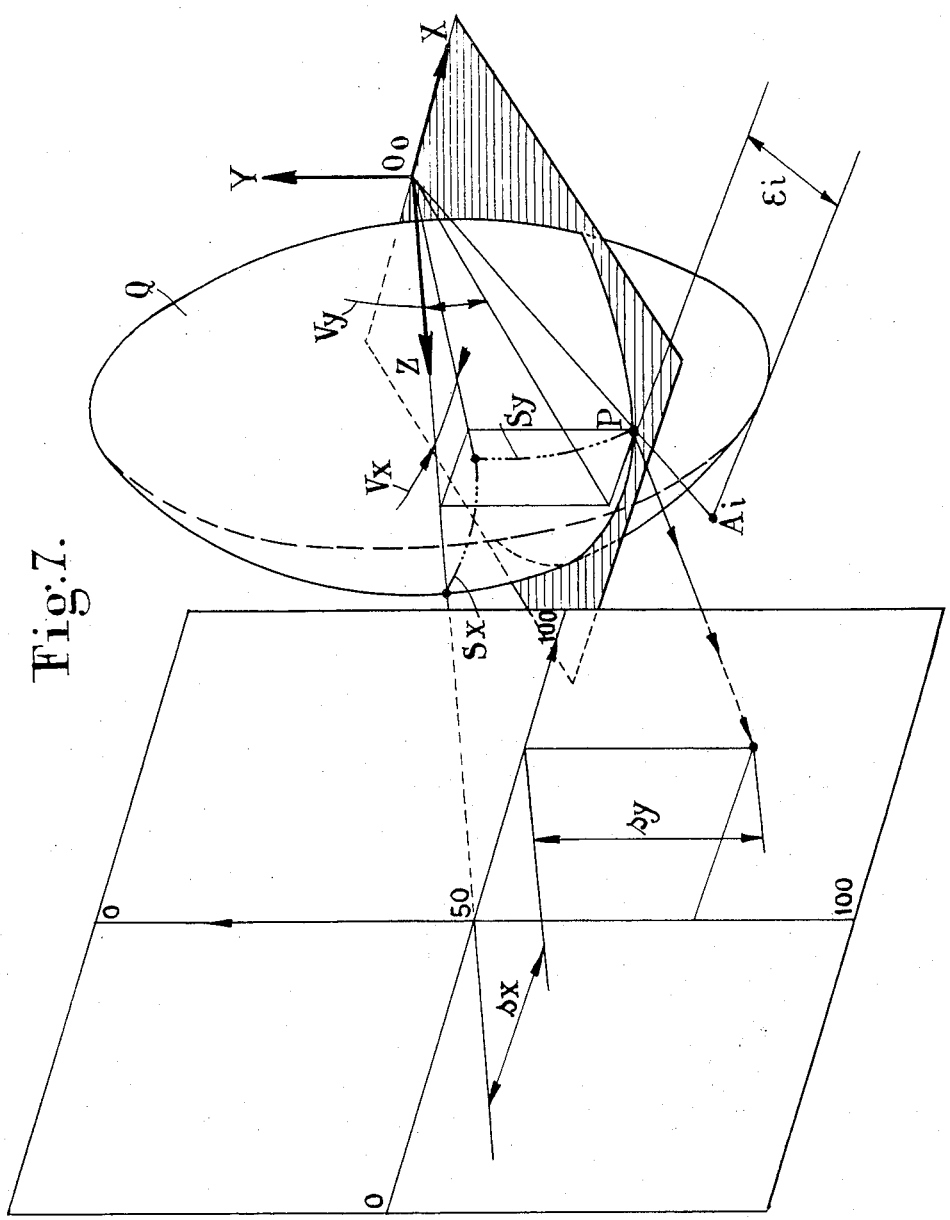
FIG. 7 shows the reference system principle used for obtaining a discrepency table.

FIG. 7 illustrates how each point $A_i$ of a surface can be referenced to a basic sphere Q and the significance of the discrepency table coordinates. $s_x$ and $s_y$ are respectively the lengths of the arcs $S_x$ and $S_y$ which are the spherical coordinates of point $A_i$, measured on sphere Q from the intersection of the axis $O_oZ$ with sphere Q in the reference trihedral OoXYZ.

In this example it is assumed that the meridian curve of progression of the progressive lens lies in the vertical meridian plane which thus divides said lens into a right-hand portion and a left-hand portion which is a mirror image of the right-hand portion. Accordingly the discrepency table of the whole progressive surface is symmetrical with respect to its central column (column 50) which corresponds to the discrepencies to the basic sphere in the vertical meridian plane. Therefore only the right-hand portion of the discrepency table of the examplary lens is given in FIG. 8, it being understood that the remaining left-hand portion of said table is the mirror image of the right-hand portion with respect to column 50.

FIGS. 8a and 8b show the discrepency table of the half of the far vision upper portion of the aberration correcting progressive surface of the examplary lens when corrected for aberrations according to the invention. This upper surface portion is a portion of an aspheric surface of revolution since the far vision portion of the examplary lens corresponds to a spherical + 12.00 D single focus lens.

FIGS. 8c and 8d show the discrepency table of the right-hand half of the intermediate and near vision portions of the aberration correcting progressive surface of the examplary lens. In FIG. 8a to 8d column 50 gives the discrepencies of the section of the aberration correcting progressive surface by the vertical meridian plane of the lens, and line 50 gives the discrepencies of the section of the right-hand half of the aberration correcting progressive surface by the horizontal meridian plane of the lens.

FIG. 9 is a diagram showing the shape of the sections C50 to C86 of the lower right-hand quarter of the aberration correcting progressive surface by planes 50 to 86 parallel to the vertical meridian plane, the basic sphere having conventionally in this figure a radius of infinite length, which is represented by the horizontal axis. In other words these curves 50 to 86 are plotted in terms of discrepencies between the basic sphere and the aberration correcting progressive surface of the examplary lens in the seven section planes 50 to 86, which are regularly spaced from one another a distance of 6 mm in the conventional reference system of the FIG. 7, and parallel to the vertical meridian plane of the lens. The curve C50 is of course the representation of the profile of the meridian curve of progression itself.

Figure 10:
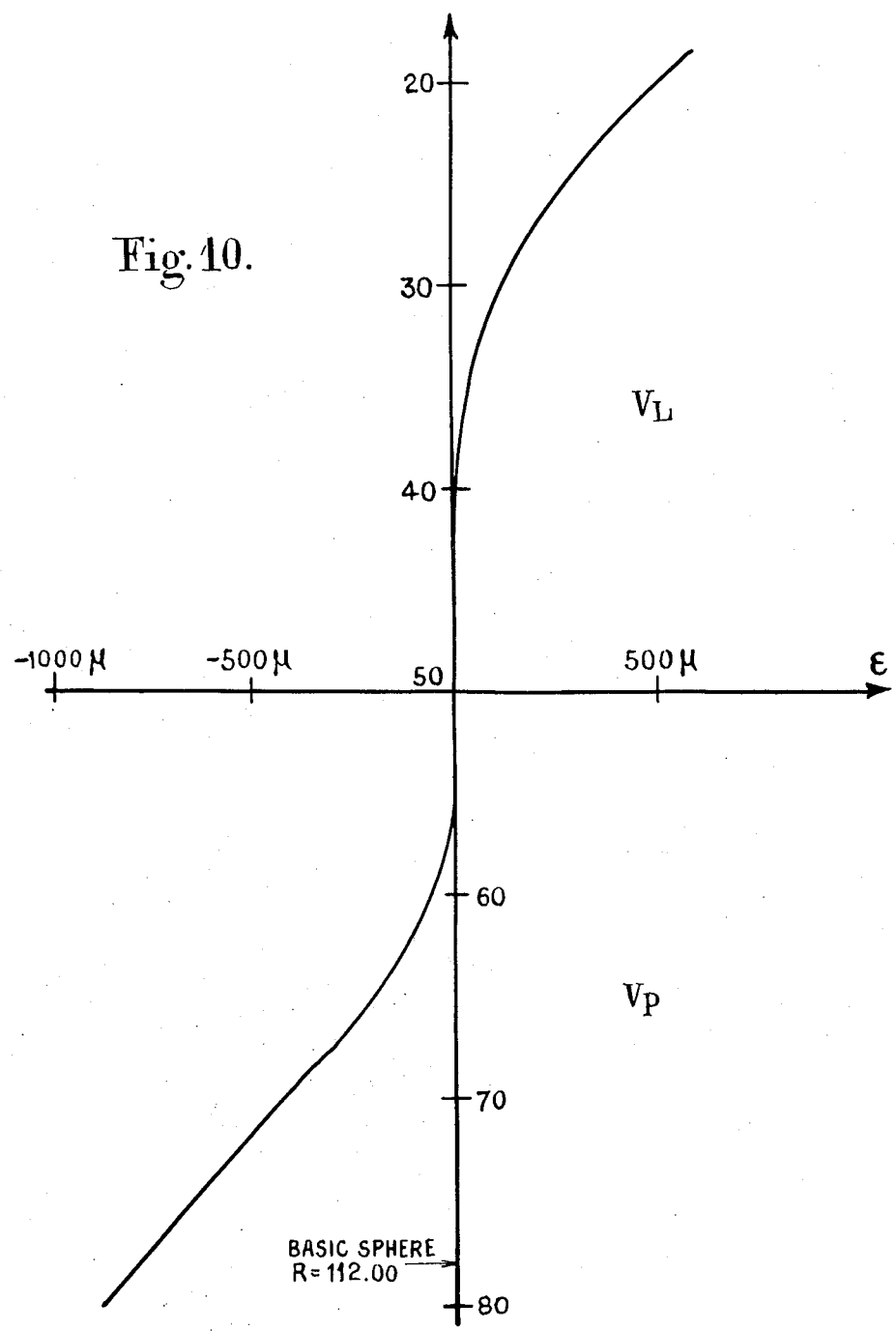
FIG. 10 shows the section of the aberration correcting progressive surface of the examplary lens by the vertical meridian plane of progression of said examplary lens, said section being plotted in terms of discrepencies with respect to said basic sphere.

FIG. 10 is a diagram showing the shape of the section of the aberration correcting progressive surface by the vertical meridian plane of progression, this representation is conventional since the section of the basic sphere (here the vertical axis) has been represented with a radius of infinite length. This diagram shows in fact, the deformations brought to the spherical meridian of the basic sphere Q in this vertical meridian plane. In the upper part of FIG. 10, one can see the meridian of the upper far vision portion $V_L$ and, in the lower part of FIG. 10, the meridian curve of progression itself.

FIG. 11 illustrates the general characteristics of the lens chosen as an example and on the right side thereof, a diagram showing the deformations to be brought to the basic sphere to obtain the aberration correcting progressive surface of the examplary lens. These deformations are illustrated by iso-discrepency curves, that is to say curves along which the discrepencies to the basic sphere Q are identical. The vertical axis corresponds to the vertical meridian plane of progression, the horizontal axis corresponds to the horizontal medirian plane of the lens. The values of the discrepencies are indicated in microns.

In the upper part of the drawing corresponding to the far vision portion $V_L$ of the surface these curves are circular which clearly points out the fact that this far vision portion is a portion of an aspheric surface of revolution.

In the lower part, these curves are perpendicular to the vertical axis which is a result of the choice of a surface which is symmetrical with respect to the vertical meridian of progression. These curves get closer to one another as they reach the circular contour of the lens, where they concentrates in a small zone of the lens. This points out the fact that the useful portion of the progressive surface has been as much as possible widened at the expense of the smoothness of small lateral zones which give large deformations or aberrations making them unusable. This unavoidable shortcoming is already well known in the umbilical progressive lenses of the prior art.

Under the extreme lateral portions of the horizontal meridian these lines show the same concentration. This points out the fact that the discrepencies have been choosen to lead to a smooth surface presenting no aberrations in the far vision useful zone of the lens situated above horizontal meridian, and strong aberrations in the lateral unusable zone situated under the extreme lateral portions of said horizontal meridian.

These remarks based upon FIG. 11, shows that the aberration correcting progressive surface according to the invention is physically determined in its useful zones by optical calculations as hereinabove explained, and in its lateral zones, which are rendered unusable by the unavoidable aberrations, by approximations based upon geometrical calculation corrected according to the results of successive experimentations actually made or simulated on a computer, to obtain the best compromise between surface continuity or smoothness and lateral peripheral image deformations. The problem of lateral unusable zones of the aberrations correcting progressive surfaces according to the invention is exactly the same as the problem of lateral unusable zones of umbilical progressive surfaces of progressive lenses known from the prior art, and of course finds the same solutions.

Figure 12:
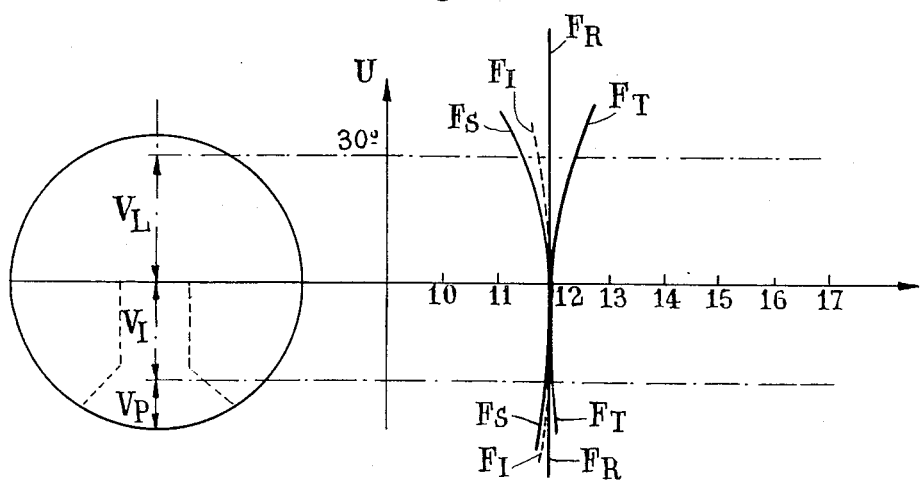
FIG. 12 is a diagram showing the aberrations of the examplary lens.
Figure 13:
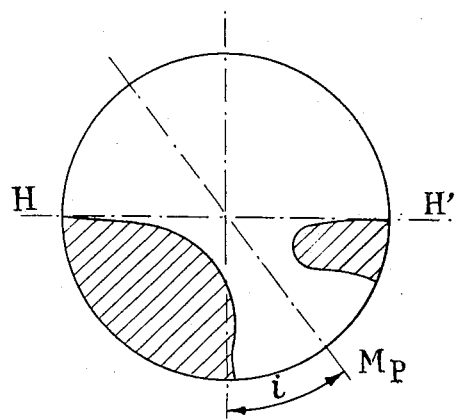
FIG. 13 shows a modified form of embodiment of the progressive lens of the invention.

FIG. 12 is a diagram showing the result obtained with the aberration correcting progressive surface of the examplary lens. It shows the good quality of the image given by such a lens and observed by the patent's eye, of a point drawing nearer to the patient from infinity to the reading distance of 0.33 m.

Instead of making a concave aberration correcting progressive surface as explained hereinabove in the given example, one can manufacture lenses with aberration correcting progressive surfaces on the convex side of the lens, the concave side of the lens being made of a refractive surface of any known type spherical or toroidal for instance. In fact, this is seldom made, for in high power uncorrected lenses the upper far vision portion of the convex side is usually a spherical or toroidal surface portion with very small radii which leads to problems to manufacture an aberration correcting progressive surface on this convex side.

The example has been given for a progressive lens having a spherical far vision power zone. This is usually the case in actual production. However when one needs a toric lens, a toroidal surface is associated with an aberration correcting progressive surface as one for a progressive lens having a spherical for vision zone lens, but the aberration correction of which is choosen intermediate between the needed corrections for the two main meridians of the far vision toroidal zone. This is due to the fact that for every orientation of the toroidal characteristic of the lens with respect to the horizontal, which depends on the patient's ametropia, a new aberration correcting progressive surface should be needed, which leads to a too expensive product. But in doing so one should be within the scope of the invention.

The same processes, and machinery are used to manufacture lenses according to the invention, as to manufacture umbilical progressive lenses of the prior art. These processes and machinery have been recalled in the introduction part of this specification. For saving weight, they are preferably molded by using a polymerizable refringent material and appropriately shaped molds, instead of being directly cut, ground and polished in a block of refringent material, glass for instance.

This example has been given in a the case of a lens symetrical with respect to the meridian plane of progression. In fact, as it has been explained in the previous commonly assigned U.S. Pat. application Ser. No. 19,772, filed Mar. 4, 1970, in the name of B. CRETIN-MAITENAZ, and as it is shown by FIG. 14 which corresponds to FIG. 7 of the above-mentioned copending U.S. patent application, the aberration correcting progressive surface of a lens according to the invention, could easily be designed so that its meridian plane of progression $Mp$ be downwardly inclined from temporal side to nasal side of the lens when in use, in order to take into account the convergence of the sight axes of the patent, the intermediate progressive surface of the aberration correcting progressive surface being no longer symetrical with respect to the meridian plane of progression, but presenting an oblique symmetry in the horizontal direction with respect to this meridian plane of progression.

What I claim is

1. - A concavo-convex ophthalmic lens with a progressively varying focal power for correcting high ametropia, comprising two refractive surfaces formed on opposite sides of a block of refringent material, the one of said two opposite refractive surfaces being a simple surface and the other of said two opposite refractive surfaces being a progressive surface, said simple surface and said progressive surface determining therebetween, when the lens is in use, an upper single focus lens portion for far vision having a first focal power and the optical center of which coincides with the optical center of the whole lens, a lower single focus lens portion for near vision having a second higher focal power and which is located around a point so-called the near vision center, and an intermediate progressive power lens portion extending from the optical center of the lens to the near vision center and on either side of the meridian plane of the lens containing said near vision center, the focal power in said intermediate lens portion progressively increasing from said first focal power at said optical center to said second higher focal power at said near vision center according to a predetermined law of progression along said meridian plane containing said near vision center and so-called meridian plane of progression, wherein said progressive surface is corrected for aberration and comprises:

an upper surface portion corresponding in position to said upper far vision lens portion, and which is identical to the corresponding upper surface portion of a first aspheric aberration correcting surface operative to correct aberrations for far vision of a first single focus lens having the same focal power as the upper far vision lens portion, said upper surface portion having at the optical center a tangential radius of curvature of a first value and a sagittal radius of curvature of a second value, a lower surface portion corresponding in position to said lower near vision lens portion, and which is identical to the corresponding lower surface portion of a second aspheric abberation correcting surface operative to correct aberrations for a vision distance of 0.33 m of a second single focus lens having the same focal power as the lower near vision lens portion, said lower surface portion having at said near vision center a tangential radius of curvature of a third value and a sagittal radius of curvature of a fourth value, said second aspheric aberration correcting surface being such that said second single focus lens exhibits neither astigmatism nor field curvature at a point having a location on said second aspheric aberration correcting surface corresponding to the location of the near vision center on said progressive surface, whereby the ophthalmic lens exhibits neither astigmatism nor field curvature at said near vision center, and an intermediate surface portion corresponding in position to said intermediate progressive power lens portion, of which the intersection with said meridian plane of progression is a curve so-called meridian curve of progression of which the radius of curvature (tangential radius) increases or decreases according as the progressive surface is the concave or convex refractive surface of the lens, respectively, from said first value of the tangential radius of the upper surface portion at the optical center to said third value of the tangential radius of the lower surface portion at the near vision center, so that the tangential focal power in the intermediate lens portion progressively increases according to the predetermined law of progression from the value of the tangential focal power at said optical center to the value of the tangential focal power at said near vision center, and of which the intersection with a plane perpendicular to said meridian curve of progression at a point thereof travelling from the optical center to the near vision center is a curve of which the radius of curvature (sagittal radius) at said travelling point increases or decreases according as the progressive surface is the concave or convex refractive surface of the lens, respectively, from said second value of the sagittal radius of the upper surface portion at the optical center to said fourth value of the sagittal radius of the lower surface portion at the near vision center, so that the sagittal focal power in the intermediate lens portion progressively increases according to the same predetermined law as the tangential focal power from the value of the sagittal focal power at the optical center to the value of the sagittal focal power at the near vision center, the increasing or decreasing rate of the value of the tangential radius being always smaller than the increasing or decreasing rate, respectively, of the value of the sagittal radius.

2. - A concavo-convex ophthalmic lens according to claim 1, wherein said simple surface is a spherical surface, and said first value of the tangential radius and said third value of the sagittal radius at the optical center are identical.

3. - A concavo-convex ophthalmic lens according to claim 1, wherein the meridian plane of progression is a plane of symmetry for the whole progressive surface.

4. - A concavo-convex ophthalmic lens according to claim 1, wherein the meridian plane of progression, when the lens is in use, is downwardly inclined from temporal side to nasal side of the lens and constitutes a plane of oblique symmetry in the horizontal direction for at least the intermediate surface portion of the progressive surface of the lens.

* * * * *